United States Patent [19]

Nishiyama et al.

[11] Patent Number: 4,995,397

[45] Date of Patent: Feb. 26, 1991

[54] PULSE DOPPLER FLOW SPEED METER

[75] Inventors: Hisashi Nishiyama; Kageyoshi Katakura; Toshio Ogawa, all of Tokyo, Japan

[73] Assignee: Hitachi, Ltd., Tokyo, Japan

[21] Appl. No.: 413,060

[22] Filed: Sep. 27, 1989

[30] Foreign Application Priority Data

Sep. 30, 1988 [JP] Japan ................................ 63-244164
Nov. 16, 1988 [JP] Japan ................................ 63-287673

[51] Int. Cl.$^5$ ............................................. A61B 12/08
[52] U.S. Cl. ............................ 128/661.09; 73/861.25
[58] Field of Search ..................... 128/661.07–661.10; 73/861.25

[56] References Cited

U.S. PATENT DOCUMENTS

| 4,751,847 | 6/1988 | Katakura et al. | 73/861.25 X |
| 4,817,618 | 4/1989 | DesJardins et al. | 73/861.25 X |
| 4,905,206 | 2/1990 | Nishiyama et al. | 73/861.25 X |
| 4,955,386 | 9/1990 | Nishiyama et al. | 73/861.25 X |

Primary Examiner—Francis Jaworski

Attorney, Agent, or Firm—Antonelli, Terry, Stout & Kraus

[57] ABSTRACT

In a pulse Doppler flow speed meter in which ultrasonic wave pulses are transmitted repetitively at transmission intervals T and thereafter transmitted repetitively at transmission intervals (T+Ts), phases of reflected waves due to reflection of individual transmission pulses are measured sequentially to provide phase signals and the phase signals are subjected to frequency analysis to determine speed distributions, distributions of phase differences between phase signals corresponding to transmission pulses transmitted at the transmission intervals T and distributions of phase differences between phase signals corresponding to transmission pulses transmitted at the transmission intervals (T+Ts) are determined. A value of center of gravity of the former phase difference distributions and a value of center of gravity of the latter phase difference distributions are determined and then a phase difference between the two values of center of gravity is determined. Obtained from the phase difference are values of Doppler shift angle, according to which the former and latter phase difference distributions are shifted so as to be compensated for their aliasing.

9 Claims, 7 Drawing Sheets

FIG. 3A TRANSMISSION
FIG. 3B RECEPTION
FIG. 3C a
FIG. 3D a'
FIG. 3E
FIG. 3F

PULSE DOPPLER FLOW SPEED METER

BACKGROUND OF THE INVENTION

The present invention relates to an apparatus for measuring the speed of an object using the ultrasonic sound wave, and particularly to an apparatus for measuring the blood flow speed in a biological body on a real-time basis.

Among the flow speed measuring apparatus based on Doppler effect of the ultrasonic sound wave, one system uses the pulsed continuous wave. The system generally has a highest measurable Doppler frequency $\frac{1}{2}T$ for the pulse transmission repetition or iteration period T. Accordingly, by choosing the value of T in compliance with the distance between the probe for transmission and reception of the ultrasonic wave and the target object, the highest measurable flow speed is determined.

The inventors of the present invention proposed in U.S. Pat. No. 4,751,847 a new pulse Doppler flow speed meter which sets two transmission iteration periods T and (T+Ts) so that the highest measurable Doppler frequency is $\frac{1}{2}$Ts, and consequently the above-mentioned highest measurable flow speed is increased by a factor of T/Ts. This improved pulse Doppler flow speed meter, however, has an inferior S/N ratio if the reflected sound wave from the flowing object is weaker than that from stationary objects, resulting possibly in the inaccurate flow speed measurement.

SUMMARY OF THE INVENTION

An object of the invention is to provide a pulse Doppler flow speed meter which can raise the highest measurable flow speed and can permit accurate flow speed measurement or flow speed distribution measurement.

The present invention features that the Doppler shift angle per se, calculated from the difference between phase differences of reflected signals generated when the ultrasonic wave is transmitted repetitively to the object at a plurality of kinds of intervals of transmission, is not used as speed detection value but is used as signal for compensating the Doppler shift angle, obtained through classic pulse Doppler process, for its aliasing. Specifically, a pulse Doppler flow speed meter of the invention is typically constructed by camprising transmission/ reception means for transmitting to an object pulsed continuous ultrasonic waves at first transmission intervals T during a first term but at second transmission intervals (T+Ts) during a second term following the first term and detecting reflected waves from the object which result from reflection of individual pulses, phase detection means for detecting phases of the reflected wave signals, filtering means for eliminating signals representative of stationary objects from sequentially produced phase signals, first Doppler shift angle calculating means for determining either distributions between phase shifts of phase signals delivered out of the filtering means which correspond to at least one of a first group of phase signals transmitted at first transmission intervals T and a second group of phase signals transmitted at second transmission intervals (T+Ts) or representative values of the distributions, second Doppler shift angle calculating means for determining a first value of center of gravity of phase differences between the phase signals of the first group and a second value of center of gravity of phase differences between the phase signals of the second group and for determining a phase difference between the first and second values of center of gravity, and compensation means responsive to an output signal of the second Doppler shift angle calculating means to compensate output signals of the first Doppler shift angle calculating means for their aliasing and for delivering compensated values indicative of either speed distributions of the object or representative values of the speed distributions.

Each of the phase differences between the phase signals of the first group indicates a Doppler shift angle during time parameter T and each of the phase differences between the phase signals of the second group indicates a Doppler shift angle during time parameter (T+Ts). Therefore, the phase difference, $Q_A$, between the first and second values of center of gravity of phase differences which is calculated from the second Doppler shift angle calculating means indicates a Doppler shift angle during time parameter Ts. On the assumption that the ratio between T and (T+Ts) is $\eta : (\eta+1)$, the value of $Q_A$ equals $1/\eta$ the phase difference between the phase signals of the first group but equals $1/(\eta+1)$ of the phase differences between the phase signals of the second group. Therefore, even when the phase differences between the phase signals of the first group or the phase differences between the phase signals of the second group exceed the range of from $-\pi$ to $\pi$, the $Q_A$ correctly indicates the Doppler shift angle $\bar{\omega}$d Ts within the range of $-\pi < +\bar{\omega}d\, Ts \leq \pi$, where $\omega$d represents an average speed (rad/sec) throughout the first and second terms. Then, the compensation means compensates either the phase shift distributions calculated from the phase differences between the phase signals of the first group or the representative values of the distributions for their aliasing in accordance with $Q_a$ which is given by $$Q_a = k \cdot 2\pi \text{ for } (2k-1)\pi \leq \eta Q_a \leq (2k+1)\pi.$$

Also, the compensation means compensates either the phase shift distributions calculated from the phase differences between the phase signals of the second group or the representative values of the distributions for their aliasing in accordance with $Q_a'$ which is given by $$Q_a' = k \cdot 2\pi \text{ for } (2k-1)\pi < (\eta+1)Q_A \leq (2k+1)\pi.$$

Other features of the invention will become apparent from the following description of the preferred embodiments.

DESCRIPTION OF THE PREFERRED EMBODIMENTS

Figure 1:
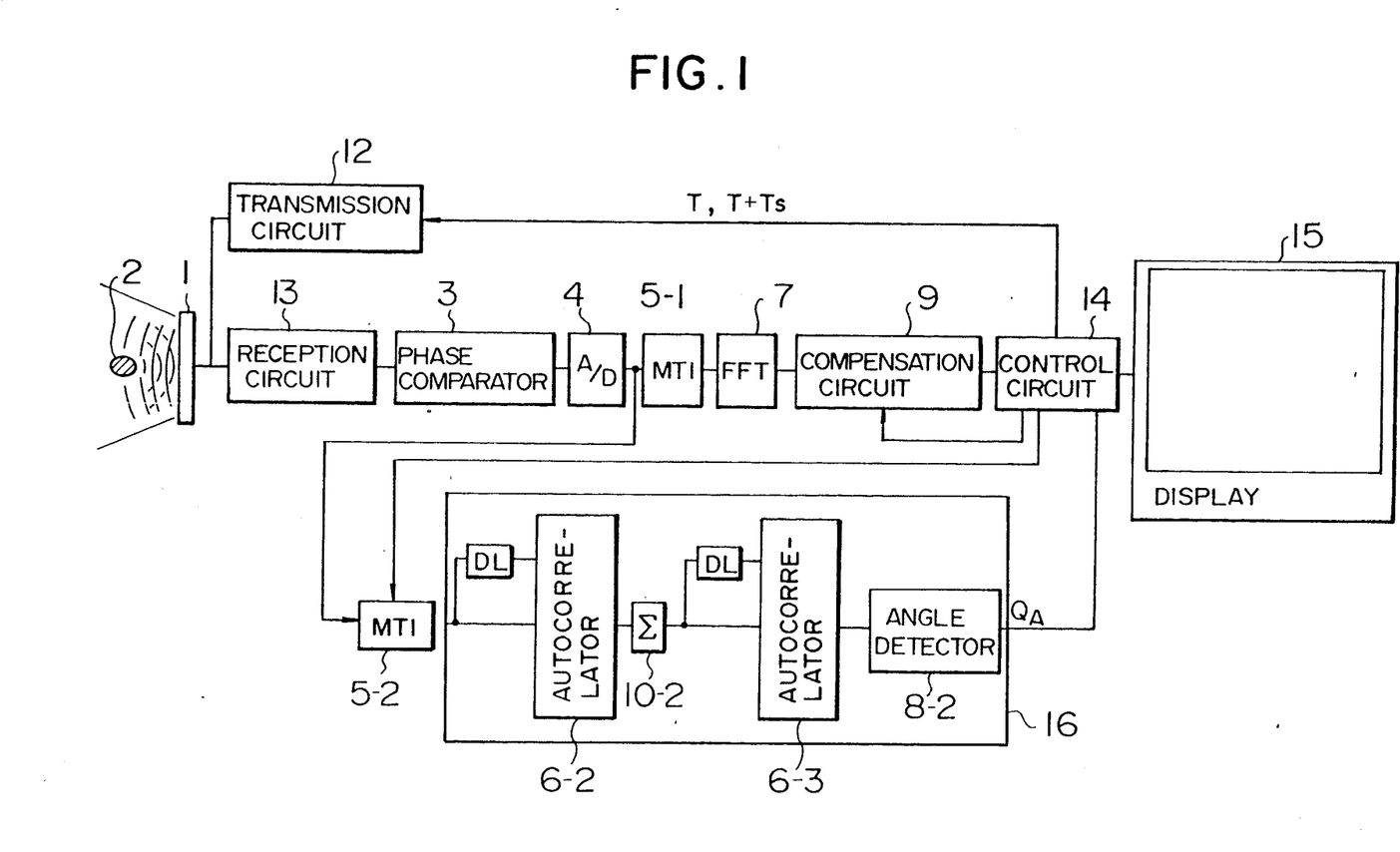
FIG. 1 is a block diagram illustrating the overall construction of a pulse Doppler flow speed meter according to an embodiment of the invention.

FIG. 1 illustrates a pulse Doppler flow speed meter according to an embodiment of the invention.

Referring to FIG. 1, a transmission circuit 12 and a reception circuit 13 are connected to an ultrasonic transducer 1, and the transmission circuit 12 first transmits a transmission signal in the form of pulses of short duration having a predetermined frequency $\omega_o$ plural times at intervals (period of ultrasonic pulse to be described below) T and subsequently transmits the transmission signal plural times at intervals (T+Ts). The transducer 1 responsive to the transmission signal repetitively transmits to an object 2 an ultrasonic pulse in the form of a plused continuous wave having a center frequency of $\omega_o$.

A wave reflected by the object 2 is detected by the ultrasonic transducer 1. The received signal thereby detected is supplied to a phase comparator 3 by way of a receiving amplifier of the reception circuit 13.

Figure 2:
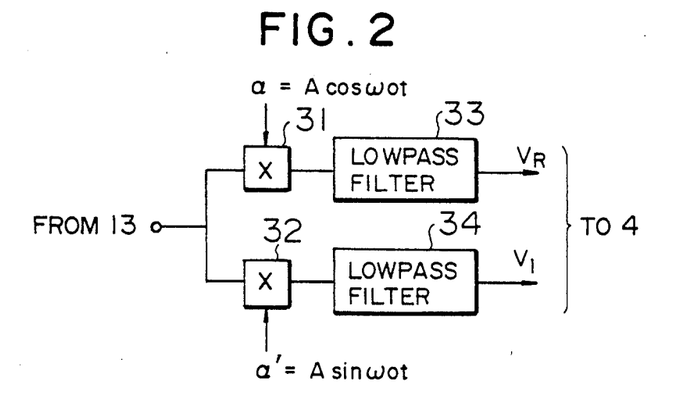
FIG. 2 is a block diagram showing the construction of a phase comparator used in the FIG. 1 embodiment.

The phase comparator 3 is constructed as shown in FIG. 2. A mixer 31 mixes the received signal with a reference wave represented by $\alpha = A \cos \omega_o t$ and a mixer 32 mixes the received signal with a reference wave represented by $\alpha' = A \sin \omega_o t$. Output signals of these mixers are delivered out of the phase comparator 3 by way of lowpass filters 33 and 34 to provide output signals $V_R$ and $V_I$. The two reference waves $\alpha$ and $\alpha'$ are 90° out of phase from each other, and the output signal $V_R$ is a low-frequency component of a mixed wave consisting of the received signal and the reference wave $\alpha$ and the output signal $V_I$ is a low-frequency component of a mixed wave consisting of the received signal and the reference wave $\alpha'$.

FIGS. 3A to 3F show waveforms at the above-described portions of this embodiment. The transmission circuit 12 transmits waves on the basis of the timing shown in FIG. 3A. More particularly, within a term covering the transmission of ultrasonic pulses $a_2$ to $a_{67}$ after the transmission of an ultrasonic pulse $a_1$, the transmission interval (ultrasonic pulse period) is T. This term is designated by TM1 and referred to as a first term. The first term TM1 is followed by a second term TM2 within which pulses $a_{68}$ to $a_{133}$ are transmitted at transmission intervals of (T+Ts) which is slightly longer than T. Here, any of the T, (T+Ts) and Ts is an integer multiple of one period $2\pi/\omega_o$ of the transmitted ultrasonic pulse (transmission pulse) having center frequency $\omega_o$ and of the reference waves, and the ratio between T and (T+Ts) is $\eta : (\eta+1)$ to indicate that T = $\eta$Ts stands.

Figure 3A:
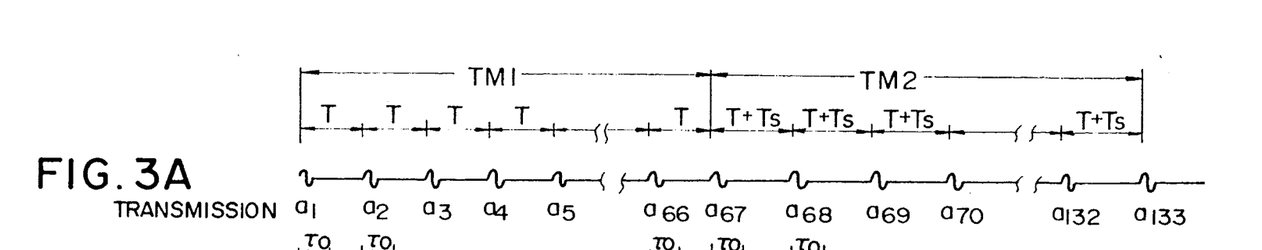
FIGS. 3A to 3F are time charts useful to explain transmission/reception operation in the FIG. 1 embodiment.
Figure 3B:
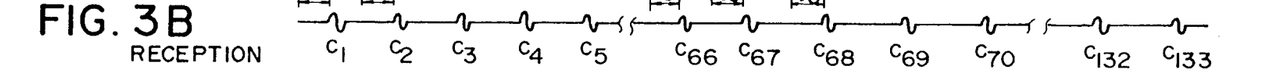
Figure 3C:
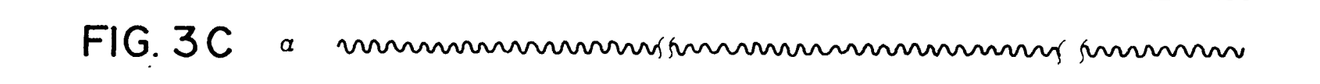
Figure 3D:
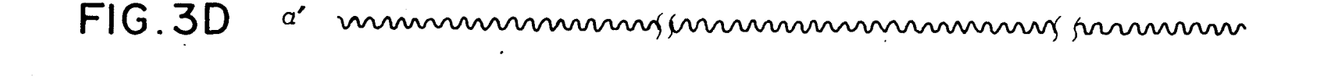

Received signals of reflected acoustic waves obtained when the pulses shown in FIG. 3A are transmitted are such as indicated by $C_1, C_2, C_3 \ldots$ in FIG. 3B. These received signals delay relative to the transmission pulses $a_1, a_2, a_3 \ldots$ by to which corresponds to an interval of time needed for the acoustic wave to go and come back between the transducer 1 and the object 2. These received signals $C_1, C_2, C_3 \ldots$ are mixed with the two reference waves $\alpha$ and $\alpha'$ as shown in FIGS. 3C and 3D the phase comparator 3 so as to detect the phase of each transmission pulse. Output signals of the phase comparator issued in response to the receiving signals Cn (n = 1, 2, 3 . . . ) are represented by $V_{Rn}$ and $V_{In}$ (n = 1, 2, 3 . . . ) which are given by equation (1)

$$V_{Rn} = An \cos \theta n$$
$$V_{In} = An \sin \theta n \qquad (1)$$

d equation (1) is reduced to a unified from of equation (2):

$$V'n = V_{Rn} + jV_{In} = An \exp(j \theta n) \qquad (2).$$

Figure 3E:
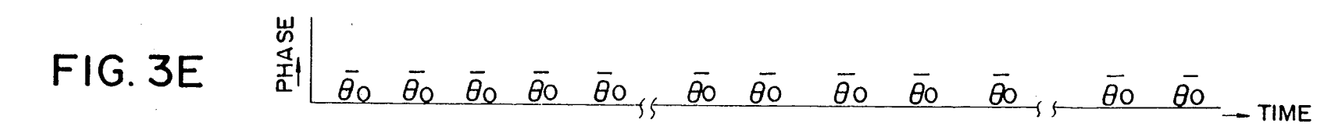

Thus, $V_{Rn}$ and $V_{In}$ are the real part and the imaginary part of a vector V'n, respectively. The phase angle $\theta n$ of the vector V'n measures a constant value $\theta o$ as shown in FIG. 3E if the object is immobile.

Figure 3F:
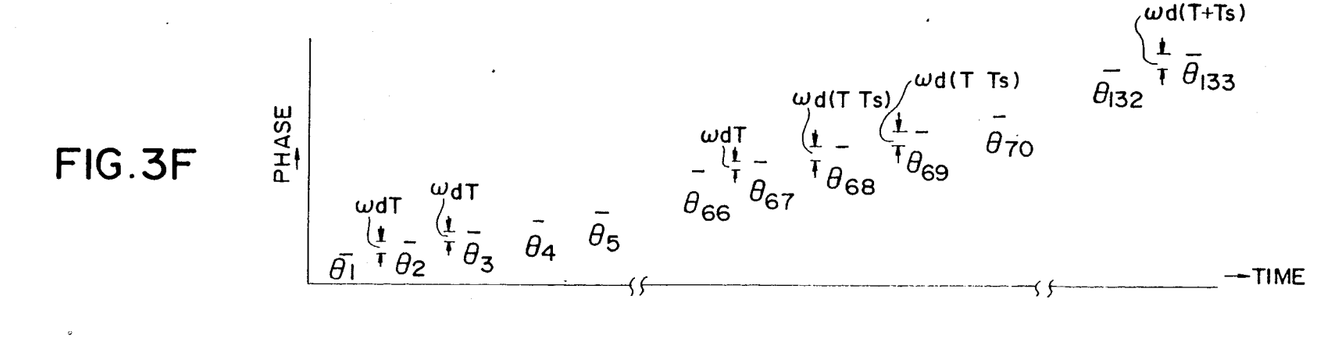

On the other hand, if the object 2 moves at a speed defined by a Doppler angular frequency $\omega d$, the phase of the received signals $C_1$ to $C_{133}$ rotates by an angle of $\omega d$ per unit time in relation to the reference signals $\alpha$ and $\alpha'$ shown in FIGS. 3C and 3D. Accordingly, among the phase vectors $V'_1$ to $V'_{133}$ delivered out of the phase comparator 3, phase vectors $V'_1$ to $V'_{67}$ of a first group which occur at the intervals T are $\omega dT$ out of phase from each other as shown in FIG. 3F and phase vectors $V'_{68}$ to $V'_{133}$ of a second group which occur at the intervals (T+Ts) are $\omega d(T+Ts)$ out of phase from each other, also as shown in FIG. 3F.

Returning to FIG. 1, an A/D converter 4 sequentially receives the phase vector signals V'n (n = 1, 2, 3 . . . 133) and converts the real part and imaginary part of each phase vector signal into digital signals. MTI filters 5-1 and 5-2 eliminate a component representative of a reflected signal from stationary objects from the digitized phase vector signals. A fast Fourier transform (FFT) unit 7 performs frequency analysis of the phase vector signal which has passed through the MTI filter 5-1 to provide distributions of Doppler shift angle due to movement of the object. In other words, the FFT 7 serves as first Doppler shift angle calculating means. On the other hand, the MTI filter 5-2 is also operable to effect a filtering processing for elimination of the stationary object signal, and the phase vector signal which has passed through the MTI filter is supplied to second Doppler shift angle calculating means 16. An output signal $Q_A$ of the second Doppler shift angle calculating means 16 is used for compensating values of output signals of the FFT 7 for their aliasing.

Figure 4:
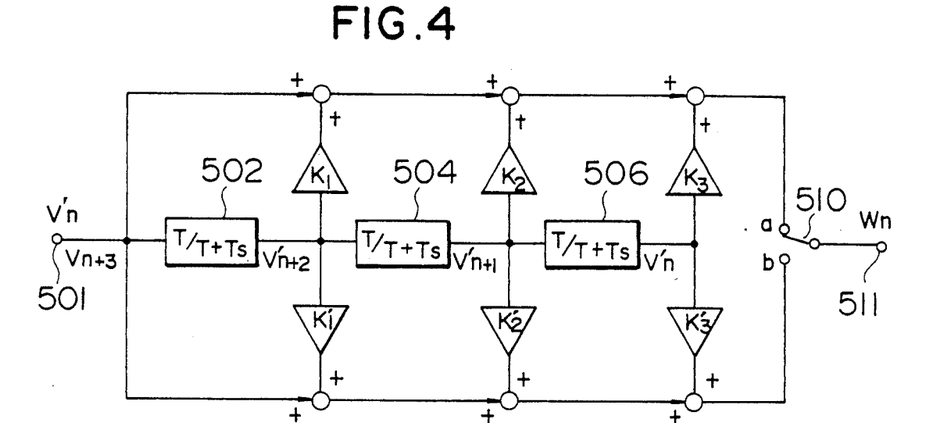
FIGS. 4 and 5 are block diagrams showing functions of first and second MTI filters used in the FIG. 1 embodiment.
Figure 6:
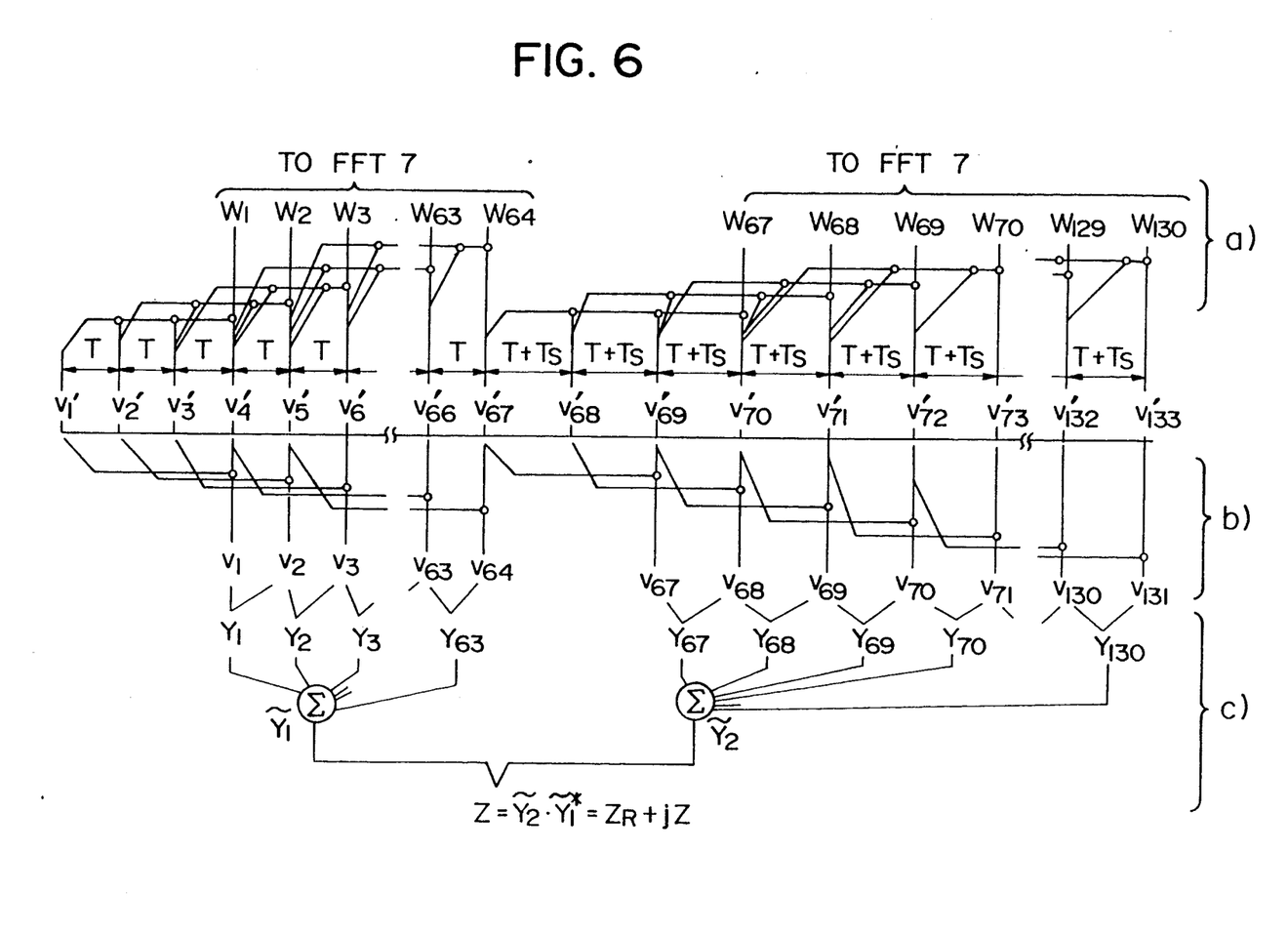
FIG. 6 is a diagram showing the concept of phase signal processings in the FIG. 1 embodiment.

FIG. 6 diagrammatically illustrates the concept of the above operation. In time series data of $V_1', V_2' \ldots V_{133}'$ delivered out of the A/D converter 4, $V_1'$ to $V_{67}'$ occur at the intervals T and $V_{68}'$ to $V_{133}'$ occur at the intervals (T+Ts). Shown at section a) in FIG. 6 is the operation of the MTI filter 5-1, which is illustrated in functional block form in FIG. 4. Referring to FIG. 4, delay elements 502, 504 and 506 are each operative to have a delay time of T during the term for reception of $V_1'$ to $V_{67}'$ at input terminal 501. During this term, a switch 510 transfers to a contact a so that output terminal 511 delivers a data series Wn subjected to filtering processing and which is given by $$W_n = V_{n+3} + K_1 V_{n+2} + K_2 V_{n+1} + K_3 V_n (n = 1 - 6 - \quad (4)$$

$$(3)$$

On the other hand, during the term for reception of $V'_{68}$ to $V'_{133}$, each of the delay elements 502, 504 and 506 operatively has a delay time of $(T+Ts)$ and the switch 510 transfers to a contact b. Consequently, delivered out of the terminal 511 is a data series Wn given by $$W_n = V'_{n+3} + K_1'V'_{n+2} + K_2'V'_{n+1} + K_3'V_n' (n=67-130) \quad (4)$$

As is clear from the above, the MT1 filter 5-1 is a tertiary filter operative to have different delay times for the terms TM1 and TM2 and provides resembling filter characteristics for the two terms by changing filter coefficients from $K_1$, $K_2$ and $K_3$ to $K_1'$, $K_2'$ and $K_3'$.

Figure 7:
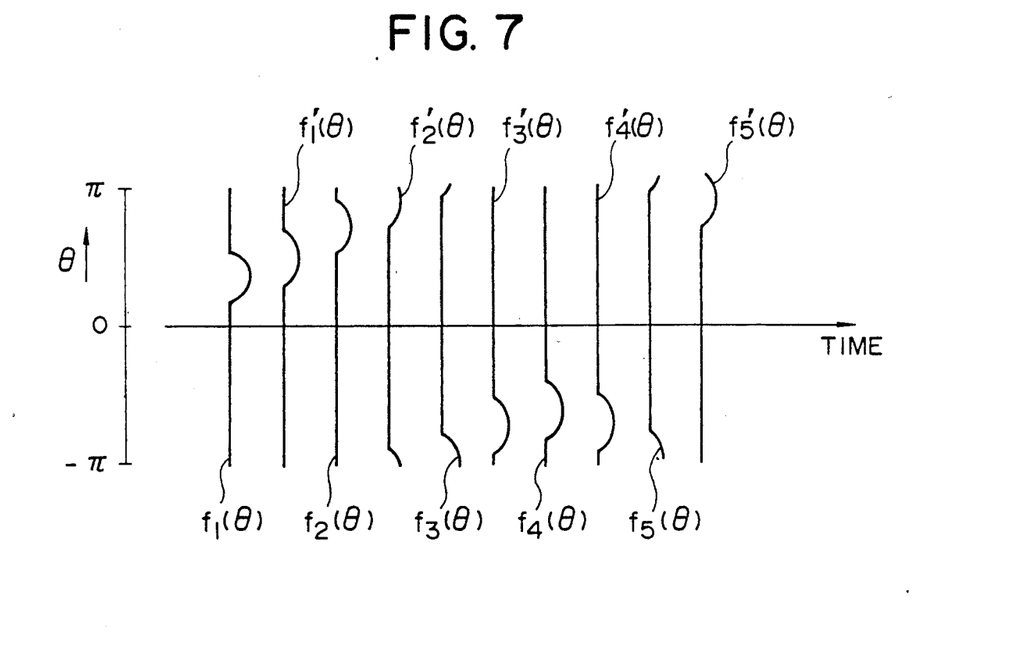
FIG. 7 is a graphic representation showing the concept of phase shift distributions before compensation in the FIG. 1 embodiment.

If the speed of the object is $\omega dn$ $(n = 1, 2, \ldots)$ for each transmission interval, phases of pieces $W_1$ to $W_{64}$ of the data series $W_n$ differ from each other by $\omega dn\,T$ and phase of pieces $W_{67}$ to $W_{130}$ differ from each other by $\omega dn\,(T+Ts)$. Accordingly, the FFT 7 performs frequency analysis for a first group of $W_1$ to $W_{64}$ of the data series $W_n$ to produce distributions $f(\theta)$ of Doppler shift angle with time parameter T and it also performs frequency analysis for a second group of $W_{67}$ to $W_{69}$ to produce distributions $f'(\theta')$ of Doppler shift angle with time parameter $(T+Ts)$. This measurement is repeated for the terms TM1 and TM2 so as to be effected in time series. The Doppler shift angle distributions thus obtained sequentially are indicated by $f_1(\theta)$, $f_1'(\theta')$, $f_2(\theta)$, $f_2'(\theta')$, $f_3(\theta)$, $f_3'(\theta')$ .... Since the time parameter is different for $f_m(\theta)$ $(m = 1, 2, 3 \ldots)$ and $f_m'(\theta')$ $(m = 1, 2, 3 \ldots)$, the later distributions are first compressed relative to the former distributions by $T/(T+Ts) = \eta/(\eta+1)$ and then these distributions are aligned on the display, thereby permitting shift of speed distributions of the object 2 to be displayed. However, as regards $f_m(\theta)$, speed components exceeding the range of $-\pi < \omega dt < \pi$ are folded on Doppler shift angle distributions within the range of $-\pi \leq \theta < \pi$. Similarly, as regards $f'_m(\theta')$, speed components exceeding the range of $-\pi < \omega d(T+Ts) \leq \pi$ are folded on Doppler shift angle distributions within the range of $-\pi < \theta' < \pi$. This phenomenon, i.e., the occurrence of aliasing is graphically illustrated in FIG. 7. A compensation circuit 9 is adapted to compensate the Doppler shift angle distributions for their aliasing in accordance with the output signal $Q_4$ of the second Doppler shift angle calculating means 16.

Shown at section b) in FIG. 6 is the operation of the MTI filter 5-2. In this embodiment, the MTI filter 5-2 produces a data series $V_n$ removed of the stationary object signal through linear filtering processing pursuant to the following equations:

$$V_n = V'_{n+3} + b'_1 V_n' (n=1-64) \quad (5a)$$

$$V_n = V'_{n+2} b_1' V_n' (n=67-131) \quad (5b)$$

Figure 5:
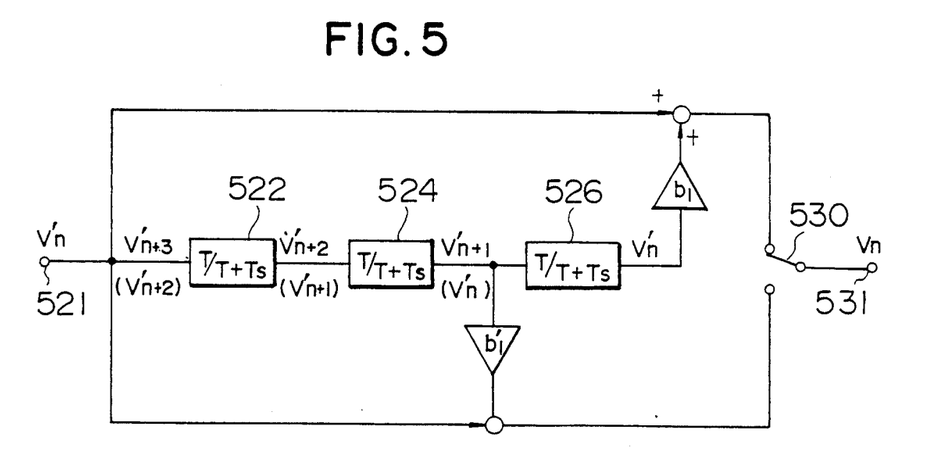

FIG. 5 is a functional block diagram for the MTI filter 5-2. Referring to FIG. 5, delay elements 522, 524 and 526 are each operative to have a delay time T during the first term TM1 for reception of data $V'_1$ to $V'_{67}$ but a delay time $(T+Ts)$ during the second term TM2 for reception of data $V'_{68}$ to $V'_{133}$. Values of T and $(T+Ts)$ are selected such that the total delay 3T in the MTI filter 5-2 during the term TM1 substantially coincides with the total delay $2(T+Ts)$ during the term TM2, thereby permitting filter characteristics during both the terms to substantially coincide with each other.

More generally, the second MTI filter performs a linear difference by a delay Td pursuant to the following equation:

$$Td = r \cdot T = S \cdot (T+Ts) \quad (6)$$

where r and s are integer. Given that the ratio between values of T and $(T+Ts)$ is an integer ratio p:q and a common multiple between p and q is C, the above condition of equation (6) can be satisfied when r and S are so related to the common multiple C as to satisfy the following equation:

$$r = c/q, \quad S = c/p \quad (7)$$

In this case, the filter coefficients $b_1$ and $b_1'$ may have the same value b for filtering pursuant to the following equation:

$$V_n = V'_{n+r} + bV'_n, \text{ for the term } Tm1; \quad (8)$$

$$V_n = V'_{n+s} + bV'_n, \text{ for the term } TM2$$

and filtering is effected in accordance with equation (8).

Shown at section c) in FIG. 6 is the operation of the second Doppler shift angle calculating means 16. The data series $V_n$ produced from the MTI filter 5-2 in the manner described as above is first subjected to a correlation processing pursuant to the following equation at an autocorrelator 6-2 to provide vectors $Y_n$ each indicative of the phase difference between received signals:

$$Y_n = V_{n+1} V_n^* \quad (9)$$

where $V_n^*$ represents complex conjugate vectors of $V_n$. Subsequently, a complex adder 10-2 performs addition pursuant to the following equation to produce a sum vector $Y_1$ for the term TM1 and a sum vector $Y_2$ for the term TM2:

$$\left. \begin{array}{l} \tilde{Y}_1 = \sum_{n=1}^{63} Y_n \\ \tilde{Y}_2 = \sum_{n=67}^{130} Y_n \end{array} \right\} \quad (10)$$

The argument of the sum vector $Y_1$ is representative of an angle of the center of gravity of the Doppler shift angles indicated by the individual phase difference vectors $Y_1$ to $Y_{63}$ occurring during the term TM1. Similarly, the argument of the sum vector $Y_2$ is representative of an angle of the center of gravity of the Doppler shift angles indicated by the individual phase difference vectors $Y_{64}$ to $Y_{132}$.

Assuming that the object 2 has an average speed of $\omega d$ throughout the terms TM1 and TM2, the sum vectors $Y_1$ and $Y_2$ can be expressed by $$\left. \begin{array}{l} \tilde{Y}_1 = B \exp(j\tilde{\omega}d\,T) \\ \tilde{Y}_2 = B \exp(j\tilde{\omega}d(T + Ts)) \end{array} \right\} \quad (11)$$

Subsequently, the vectors $Y_1$ and $Y_2$ are subjected to a correlation processing pursuant to the following equation at an autocorrelator 6-3 to provide a vector Z representative of the phase difference between phase differences at the center of gravity:

$$Z = Y_2 \cdot Y_1^* \quad (12)$$
$$= A \cdot B \cdot \exp(j\,\omega d\,Ts).$$

Subsequently, an angle detector 8-2 determines the argument arg Z of the vector Z by using the real part $Z_R$ and imaginary part $Z_I$ of the vector Z and hence the Doppler shift angle calculating means 16 delivers the output signal $Q_A$ which is $$Q_A = \arg Z = \tan^{-1}\left(\frac{Z_I}{Z_R}\right). \quad (13)$$

Since arg Z = $\bar{\omega}d\,Ts$ is held by equation (12), the output signal $Q_A$ of the means 16 represents a Doppler shift angle with time parameter Ts.

As described previously, the Doppler shift angle distributions $f_m(\theta)$ and $f'm(\theta')$ can indicate the correct speed $\omega d$ only within the ranges of $-\pi < \omega dT \leq \pi$ and $-\pi < \omega d(T+Ts) \leq \pi$ and speed distributions exce the above ranges are folded an Doppler shift angle distributions within the ranges of $-\pi < \omega \leq \pi$ and $-\pi < \theta' \leq \pi$. On the other hand, the output signal $Q_A$ of the means 16 indicates the correct average speed within the range of $-\pi < \omega d\,Ts \leq \pi$, that is, within the ranges of $\omega d$ indicated by the following equations:

$$-\eta\pi\,\omega d\,T \leq \eta\pi \quad (14)$$

$$-(\eta+1)\pi < \omega d(T+Ts) \leq (\eta+1)\pi \quad (15).$$

Thus, the compensation circuit 9 determines $\eta Q_A$ and $(\eta+1)Q_A$ on the basis of the output signal $Q_A$ of the means 16 to determine the compensation values $Q_a$ for the distributions $f_m(\theta)$ and the compensation values $Q_a'$ for the distributions $f_m'(\theta')$ as follows:

$$\begin{aligned}
Q_a &= -4\pi \quad \text{for } -5\pi < \eta \cdot Q_A \leq -3\pi, \\
Q_a &= -2\pi \quad \text{for } -3\pi < \eta \cdot Q_A \leq -\pi, \\
Q_a &= 0 \quad \text{for } -\pi < \eta \cdot Q_A \leq \pi, \\
Q_a &= 2\pi \quad \text{for } \pi < \eta \cdot Q_A \leq 3, \\
Q_a &= 4\pi \quad \text{for } 3\pi < \eta \cdot Q_A \leq 5,
\end{aligned} \quad (16)$$

which takes the general form of $$Q_a = k \cdot 2\pi \quad \text{for } (2k-1)\pi < \eta\,Q_A \leq (2k+1)\pi; \quad (16')$$

$$\begin{aligned}
Q'_a &= -4\pi \quad \text{for } -5\pi < (\eta+1) \cdot Q_A \leq -3\pi, \\
Q'_a &= -2\pi \quad \text{for } -3\pi < (\eta+1) \cdot Q_A \leq -\pi, \\
Q'_a &= 0 \quad \text{for } -\pi < (\eta+1) \cdot Q_A \leq \pi, \\
Q'_a &= 2\pi \quad \text{for } \pi < (\eta+1)\,Q_A \leq 3\pi, \\
Q'_a &= 4\pi \quad \text{for } 3\pi < (\eta+1)\,Q_A \leq 5\pi,
\end{aligned} \quad (17)$$

which takes the general form of $$Q'_a = k \cdot 2\pi \quad \text{for } (2k-1)\pi < (\eta+1)Q_A \leq (2k+1)\pi \quad (17').$$

Figure 8:
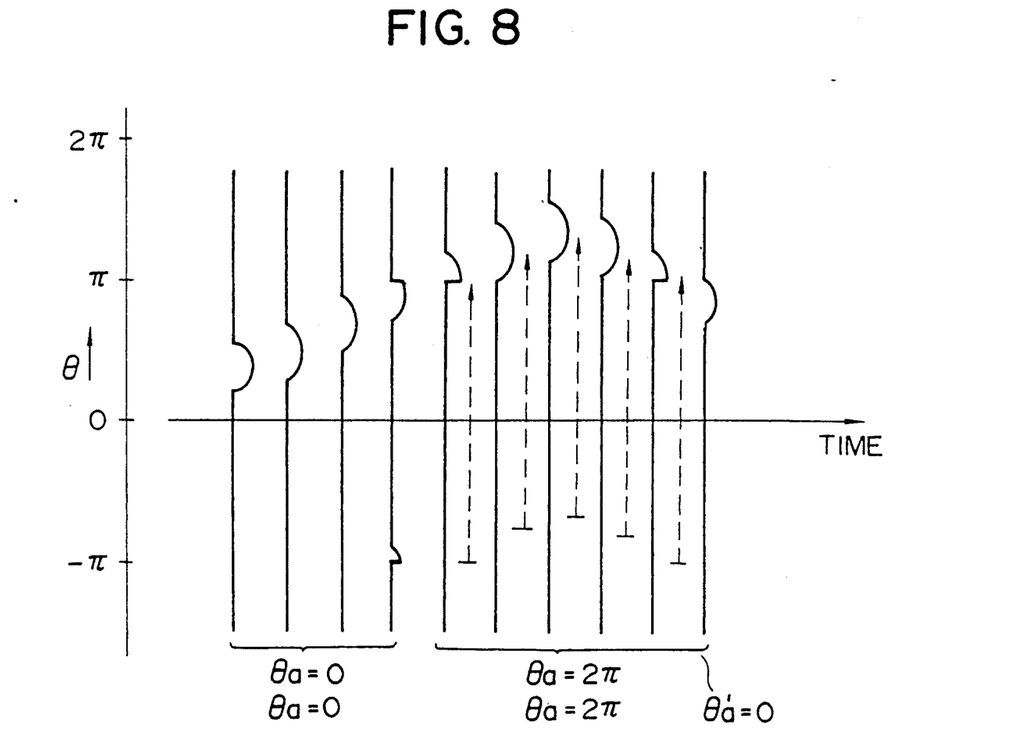
FIG. 8 is a graphic representation showing the concept of phase shift distributions after compensation in the FIG. 1 embodiment.

The compensation circuit 9 displaces the distributions for $(\theta)$ by the thus obtained $Q_a$ and the distributions $f'm(\theta')$ by the thus obtained $Q'_a$ to compensate these distributions for their aliasing. Further, for the distributions $f'm(\theta')$, the compensation circuit effects the previously-described relative compression of the distributions by $\eta/(\eta+1)$. Results of the compensation are graphically shown in FIG. 8.

A control circuit 14 shown in FIG. 5 controls the operation of each block and supplies the compensated distributions to a display 15. The display 15 operates to display the Doppler shift angle distributions aligned sequentially as shown in FIG. 18 to visualize shift of the speed distributions.

In the foregoing embodiment, the FFT 7 determines the Doppler shift angle distributions $f_m(\theta)$ and $f'm(\theta')$ and values of the thus determined distributions are compensated for their aliasing. In an alternative, representative values of the distributions $f_m(\theta)$ and $f'm(\theta')$ are determined and the thus determined representative values may be compensated for their aliasing. To this end, in place of the FFT 7 shown in FIG. 1, first Doppler shift angle calculating means as shown in FIG. 9 may be used.

Figure 9:
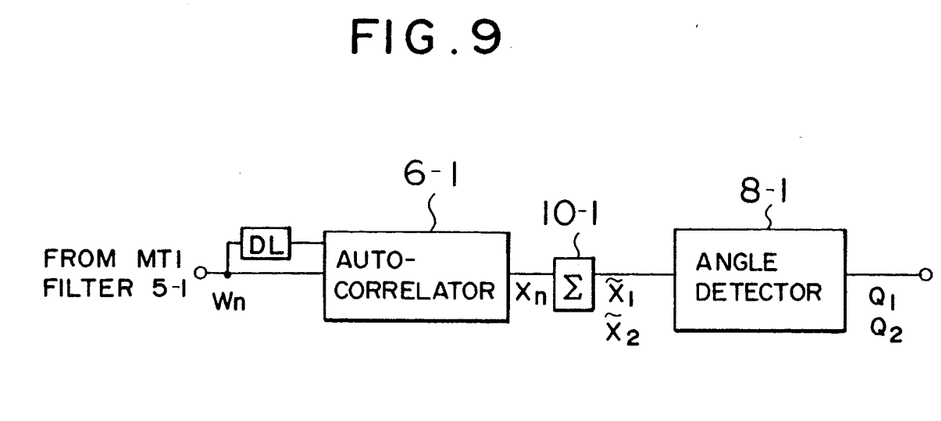
FIG. 9 is a block diagram showing the essential part of another embodiment of the pulse Doppler flow speed meter according to the invention.

Structurally, an autocorrelator 6-1 and a complex adder 10-1 of the FIG. 9 means are totally the same as those of the calculating means 16 shown in FIG. 1. Accordingly, the autocorrelator 6-1 responds to the output data series Wn from the MTI filter 5-1 to produce phase difference vectors Xn which are indicated by $$X_n = X_{n+1} \cdot W_n^* \quad (18).$$

The complex adder 10-1 then produces a sum vector $\tilde{X}_1$ for the term TM1 and a sum vector $\tilde{X}_2$ for the term TM2 which are indicted by $$\left.\begin{aligned}
\tilde{X}_1 &= \sum_{n=1}^{63} W_n \\
\tilde{X}_2 &= \sum_{n=67}^{130} W_n
\end{aligned}\right\} \quad (19)$$

An angle detector 8-1 detects an argument $Q_1$ of the sum vector $\tilde{X}_1$ and an argument $Q_2$ of the sum vector $\tilde{X}_2$. Given that the object has an average speed $\omega d_1$ during the term TM1 but an average speed $\omega d_2$ during the term TM2, the arguments $Q_1$ and $Q_2$ are given by $$\left.\begin{aligned}
Q_1 &= \bar{\omega} d_1\,T \\
Q_2 &= \bar{\omega} f_2(T+Ts)
\end{aligned}\right\} \quad (20)$$

In this manner, the Doppler shift angle calculating circuit of FIG. 9 uses values of center of gravity of the arguments possessed by a plurality of phase difference vectors occurring during the term TM1 and by a plurality of phase difference vectors occurring during the term TM2, so as to calculate the Doppler shift angle $Q_1$ representative of an average speed during the term TM1 and the Doppler shift angle $Q_2$ representative of an average speed during the term TM2. In this phase of calculation, the problem of the previously-described aliasing is again encounterd. Accordingly, the compensation circuit 9 of FIG. 1 is also operative to determine $(Q_1 = Q_a)$ by using the compensation value $Q_a$ pursuant to equation (16) or (16') and to determine $(Q_2+Q'_a)$ by using the compensation value $Q'_a$ pursuant to equation (17) or (17'), thereby providing Doppler shift angles which are compensated, for their aliasing. Subsequently, average speeds $\bar{\omega}d_1$ and $\bar{\omega}d_2$ freed from the time parameters T and (T+Ts) can be obtained pursuant to $$\begin{aligned} \bar{\omega}d_1 &= (Q_1 + Q_2)/T \\ \bar{\omega}d_2 &= (Q_2 = Q'_2)/(T + Ts) \end{aligned} \right\} \quad (21)$$

Figure 10:
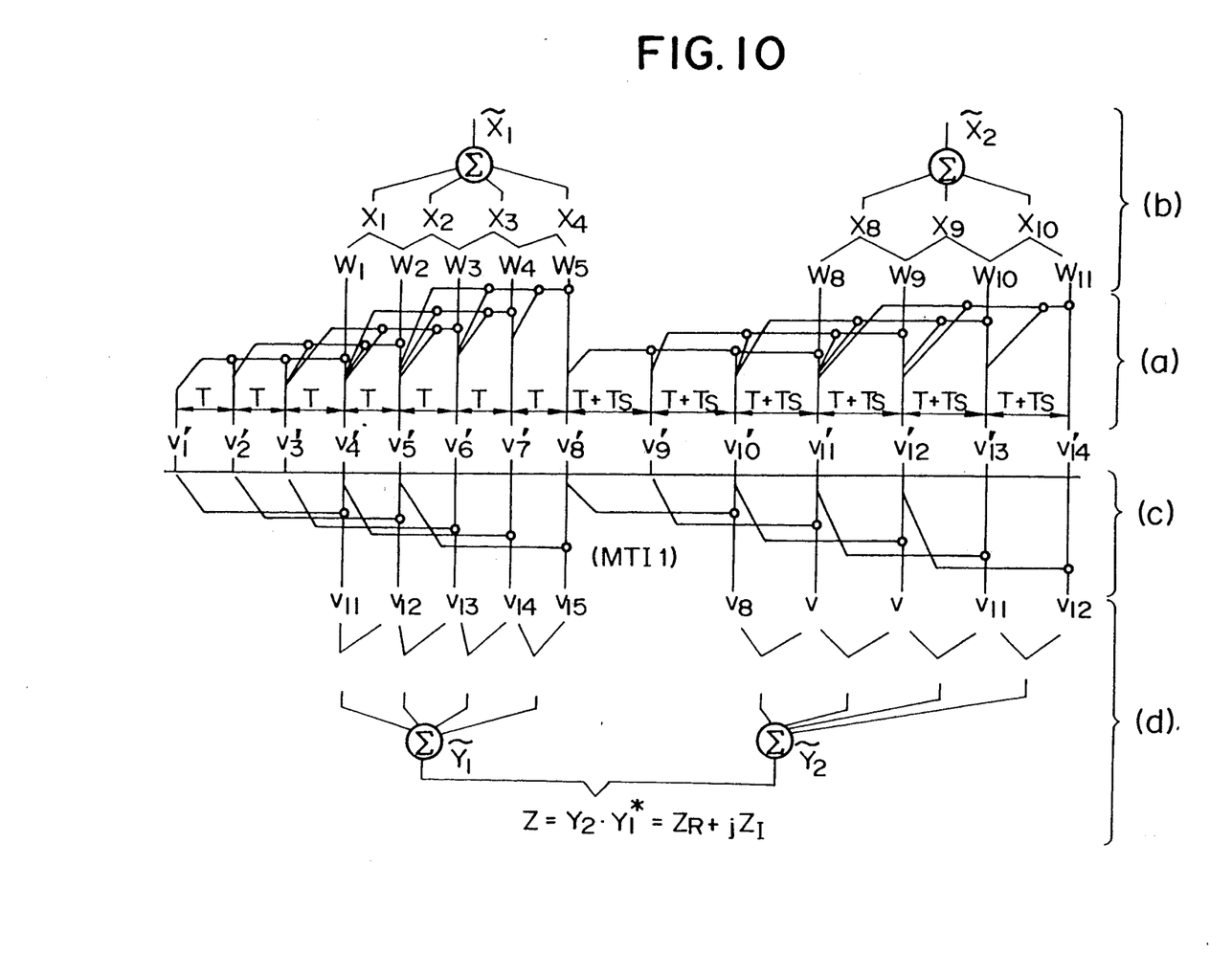
FIG. 10 is a diagram showing the concept of operation of the FIG. 9 embodiment.

In the foregoing, the apparatus using the FIG. 9 Doppler shift angle calculating means is also described as being operated at the rate of the repetition frequency of the transmission pulse shown in FIGS. 3A to 3F. However, in order to obtain the phase difference at the center of gravity on the basis of the sum vector of phase difference vectors, such a large number of data pieces are not required. Component parts of the apparatus using the FIG. 9 Doppler shift angle calculating means are operated as shown in FIG. 10 so that pulse transmission maybe effected eight times during the term TM1 and six times during the term TM2 and the sum vector of phase difference vectors may be obtained for each term. Shown at section (a) in FIG. 10 is the operation of the MTI filter 5-1, at section (b) is the operation of the FIG. 9 Doppler shift angle calculating means, at section c) is the operation of the MTI filter 5-2 and at section d) is the operation of the Doppler shift angle calculating means 16. As is clear from the above, this embodiment using the FIG. 9 Doppler shift angle calculating means can decrease the frequency of transmission during each term to obtain the average speeds $\omega d_1$ and $\omega d_2$ within a short period of time and therefore may be applied to a color Doppler apparatus wherein speeds at respective positions within a slice are sequentially measured to display speed distributions in terms of hue.

While in the foregoing embodiments the Doppler shift angle distributions or representative values of the distributions are determined for both the terms TM1 and TM2, the distribution or representative values may otherwise be determined for only one of the terms and may be compensated by the compensation values determined on the basis of the output signal $Q_A$ of the Doppler shift angle calculating means 16.

We claim:

1. A pulse Doppler flow speed meter comprising:
transmission/reception means for transmitting repetitively to an object ultrasonic pulses in the form of pulsed continuous waves at first transmission intervals T during a first term but at second transmission intervals (T + Ts) during a second term following the first term and detecting reflected waves from the object which results from reflection of individual pulses;
phase detection means for detecting phases of the reflected waves;
filtering means for eliminating signals representative of stationary objects from phase signals sequentially produced from said phase detection means;
first Doppler shift angle calculating means for determining either distributions between phase shifts of phase signals delivered out of said filtering means which correspond to at least one of a first group of phase signals transmitted at first transmission intervals T and a second group of phase signals transmitted at second transmission intervals (T + Ts) or representative values of the distributions;
second Doppler shift angle calculating means for determining a first value of center of gravity of phase differences between the phase signals of said first group and a second value of center of gravity of phase differences between the phase signals of said second group and for determining a phase difference between said first and second values of center of gravity; and
compensation means responsive to an output signal of said second Doppler shift angle calculating means to compensate output signals of said first Doppler shift angle calculating means for their aliasing and for delivering compensated values indicative of either speed distributions of said object or representative values of the speed distributions.

2. A pulse Doppler flow speed meter according to claim 1 wherein said first Doppler shift angle calculating means comprises a Fourier transform unit which performs frequency analysis of a plurality of phase signals to determine distributions of phase differences between said phase signals.

3. A pulse Doppler flow speed meter according to claim 1 wherein said first Doppler shift angle calculating means sequentially determines phase difference vector signals indicative of phase differences between a plurality of phase signals and determines a value of center of gravity of the phase differences between the plurality of phase signals from an argument of the sum vector of the plurality of phase difference vectors.

4. A pulse Doppler flow speed meter according to claim 1 wherein said first Doppler shift angle calculating means determines first distributions of phase shifts between the phase signals of said first group and second distributions of phase shifts between the phase signals of said second group, and said compensation means determines first compensation values $Q_a$ for said first distributions and second compensation values $Q'_a$ for said second distributions in accordance with the output signal of said second Doppler shift angle calculating means.

5. A pulse Doppler flow speed meter according to claim 4 wherein said compensation means compresses one of said first and second distributions compensated with said first and second compensation values $Q_a$ and $Q'_a$, respectively, relative to the other distributions so as to eliminate the difference between said compensated first and second distributions which is due to the difference in time parameter between said first and second distributions.

6. A Doppler pulse flow speed meter according to claim 4 wherein said first and second compensation values $Q_a$ and $Q'_a$ produced from said compensation means are given by $$Q_a = k \cdot 2\pi \text{ for } (2k-1)\pi < \eta Q_A \leq (2k+1)\pi$$

and $$Q'_1 = k \cdot 2\pi \text{ for } (2k-1)\pi < (\eta+1)Q_A \leq (2k+1)\pi$$

where the ratio of said first transmission interval T to said second transmission interval (T + Ts) is $\eta:(\eta+1)$ and the output signal of said second Doppler shift angle calculating means is $Q_A$.

7. A pulse Doppler flow speed meter according to claim 1 wherein said first Doppler shift angle calculating means determines a first value $Q_1$ of center of gravity of phase differences between the phase signals of said first group and a second value $Q_2$ of center of gravity at phase differences between the phase signals of said second group, and said compensation means determines compensation values $Q_a$ for said first value $Q_1$ of center of gravity and compensation values $Q'_2$ for said second value $Q_2$ of center of gravity.

8. A pulse Doppler flow speed meter according to claim 7 wherein said compensation means applies to said first value $Q_1$ of center of gravity a compensation operation pursuant to $$\bar{\omega}d_1 = (Q_1 + Q_a)/T$$

to provide a first speed average value $\bar{\omega}d_1$ and applies to said second value $Q_2$ of center of gravity a compensation operation pursuant to $$\bar{\omega}d_2 = (Q_2 + Q'_a)/(T=Ts)$$

to provide a second speed average value $\bar{\omega}d_2$.

9. A pulse Doppler flow speed meter according to claim 7 wherein said first and second compensation values $Q_a$ and $Q'_a$ are given by $$Q_a = k \cdot 2\pi \text{ for } (2k-1)\pi < \eta Q_A \leq (2k+1)\pi$$

$$Q_a = k \cdot 2\pi \text{ for } (2k-1)\pi < \eta Q_A \leq (2k+1)\pi$$

where the ratio of said first transmission interval T to said second transmission interval (T+Ts) is $\eta:(\eta+1)$ and the output signal of said first Doppler shift angle calculating means is $Q_A$.

* * * * *